June 3, 1958 R. L. RIDDLE 2,837,740

PROPORTIONAL GATE CIRCUIT

Filed Jan. 30, 1957 2 Sheets-Sheet 1

INVENTOR.
ROBERT L. RIDDLE
BY
Mitchell & Bechert
ATTORNEYS

INVENTOR.
ROBERT L. RIDDLE
BY Mitchell & Bechert
ATTORNEYS

United States Patent Office 2,837,740

Patented June 3, 1958

2,837,740

PROPORTIONAL GATE CIRCUIT

Robert L. Riddle, Boalsburg, Pa., assignor to Haller, Raymond and Brown, Inc., State College, Pa., a corporation of Pennsylvania Application January 30, 1957, Serial No. 637,157

9 Claims. (Cl. 343—228)

This invention relates to electrical and electronic control circuits and more particularly to gating devices as components thereof for controlling, by secondary or auxiliary signals, the transmission of primary signals or primary intelligence in a communication channel.

In the present state of the electronic art, gating circuits comprising various combinations of diodes and resistors are in extensive use for effecting an on-off type of switching operation in the conductance path between a primary source and a receiving or load circuit, the gating circuits normally being driven by auxiliary electrical signals.

Frequently, advanced-circuit concepts require a graduated or variable gating device instead of an abrupt on-off switch. Such demands in the prior art have necessitated complex arrangement of conventional circuit components.

A principal object of this invention is to provide a new and simple circuit means for effecting, by auxiliary signals, substantially a linear or proportional gating and amplifying control of primary signal transmission between a source and a receiving circuit.

The practicability and commercial acceptance of wireless auto-call or paging systems depend, to a very great extent, upon portable receivers which are compact, light in weight, comparatively free from maintenance, and free from interference of the adjacent channels. Accordingly, another object of this invention is to provide an improved portable receiver for a multiplexed auto-call system in which the receiver employs a new gating and amplifying circuit means.

Figures 1, 2A, 2B, 2C, 2D:
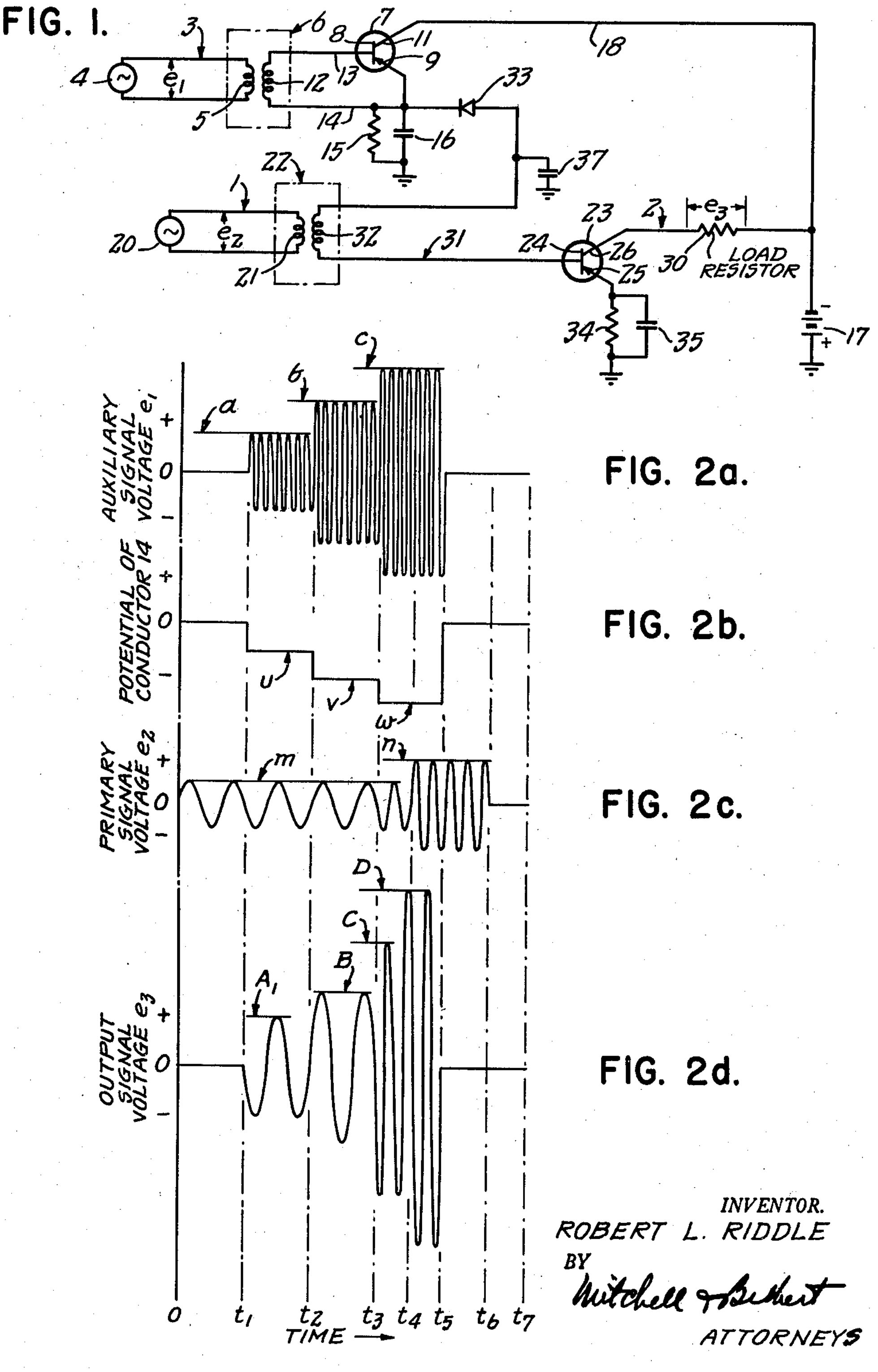
Figure 3:
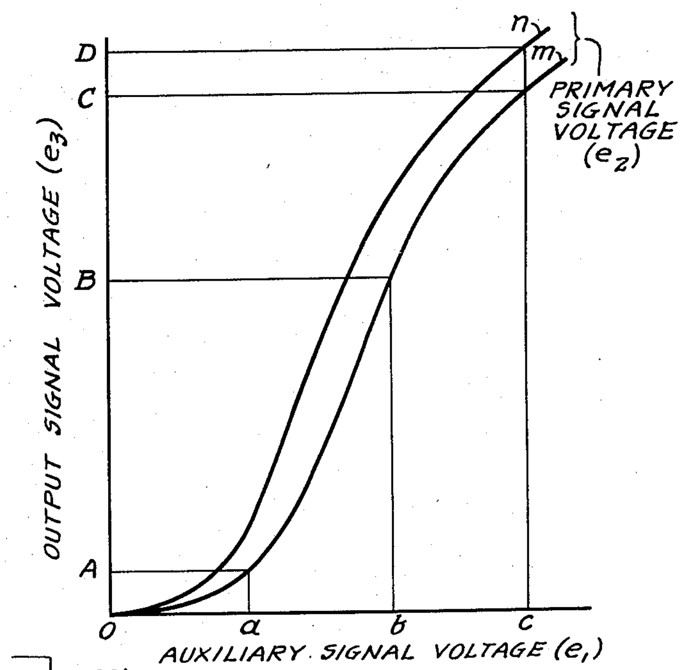
Figure 4:
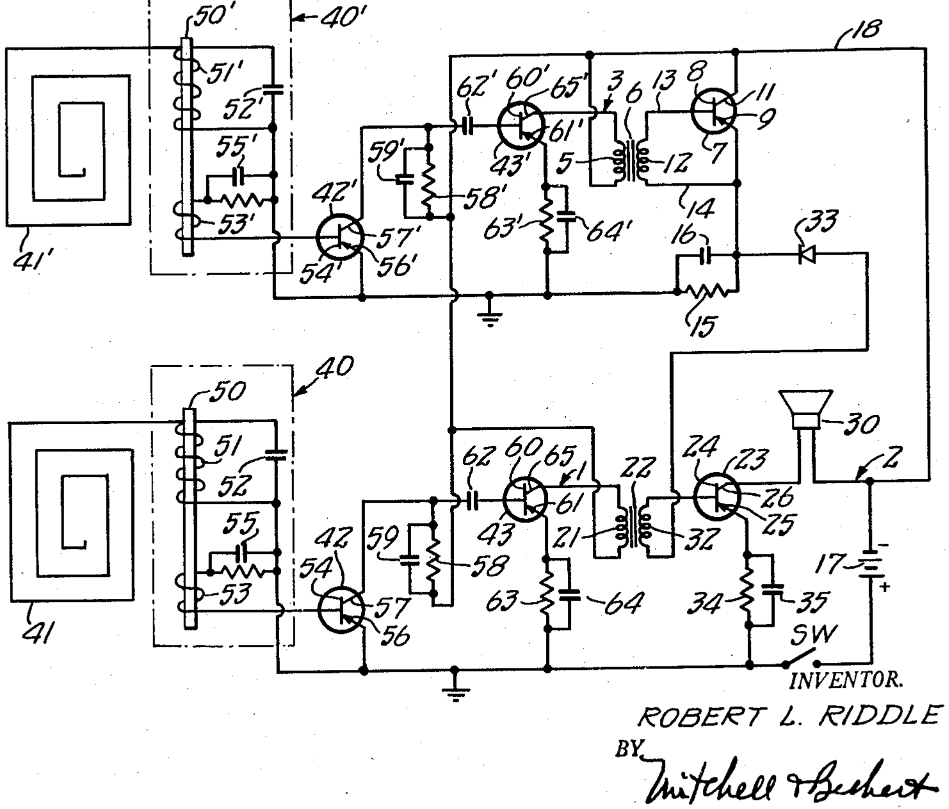

Other objects and features of the invention will be understood more clearly from the following detailed description taken in conjunction with the accompanying drawings. In said drawings, which show, for illustrative purposes only, preferred forms of the invention:

Fig. 1 is a schematic drawing of circuit means for achieving gating and amplifying control of primary signals by auxiliary signals;

Figs. 2*a*, 2*b*, 2*c* and 2*d* are diagrammatic representations of corresponding voltage variations in component circuits of Fig. 1;

Fig. 3 is a diagramatic representation of the characteristic curves for the circuitry of Fig. 1; and Fig. 4 is a schematic diagram of a portable receiver employed in an auto-call system incorporating features of the invention.

Briefly stated, my invention contemplates gating and amplifying circuit means having a signal-input circuit for receiving primary intelligence and an output load circuit for absorbing the intelligence, the circuit means incorporating transistor amplifying subcircuitry. The gating circuit means has a continuously variable conductance from substantially zero to the maximum amplifying capability of the transistor subcircuitry, as governed by separate transistor rectifying subcircuitry having an auxiliary signal circuit, the gain of the gating circuit means being controlled in substantially a linear manner by the signal strength in the auxiliary circuit. In the embodiments of the invention, the output of the transistor rectifying subcircuitry appearing across a resistor (the resistor being shunted by a condenser) yields D.-C. potentials which vary in direct proportion to the amplitudes of the A.-C. auxiliary signals; these rectified potentials are employed to bias the transistor in the amplifying subcircuitry for controlling the amplification of primary signals. This bias circuit includes (in series connection) a diode which is forward biased by the output of the rectifying subcircuitry for controlling the gain of the amplifying transistor. The desired high degree of cut-off (when the auxiliary signal is zero) is provided by means for slightly biasing the diode in a reverse direction so that the injection loss of the diode disables the primary control circuit.

In a principal embodiment of the invention, the gating and amplifying circuit means is incorporated in portable receivers which are employed in an auto-call system. Each receiver has two radio-frequency circuits connected to separate antennas and each radio frequency circuit is tuned to a discrete frequency, the two discrete frequencies in a particular permutation arrangement establishing an exclusive communication channel. Each tuner drives a detector for demodulating the received transmission. One communication channel is established when and only when a transmitter provides two modulated radio-frequency carriers corresponding to the selected resonant frequencies of the two tuners of a particular receiver, provided that the modulated carrier selected to yield signals for the auxiliary control circuit of the gating and amplifying circuit means described above has an uninterrupted modulation signal and, further, that the output of the desired circuit means is responsive to only the modulation signal of the other modulated carrier. In the presently disclosed circuit the desired portability of the receivers is optimized by employing transistors in all component stages.

Referring to Fig. 1, primary-signal transmission from a primary-signal circuit 1 to an output circuit 2 is under the gating and amplifying control of auxiliary signals in an auxiliary circuit 3.

Auxiliary control circuit 3 is energized from an auxiliary A.-C. signal source 4 and includes the primary winding 5 of a coupling transformer 6. A transistor 7 having a base electrode 8, emitter electrode 9 and collector electrode 11 is connected in a grounded emitter circuit arrangement for rectifying the A.-C. auxiliary signals in the circuit 3. Base electrode 8 and emitter electrode 9 are connected across secondary winding 12 of coupling transformer 6 by conductors 13 and 14, respectively, and a resistor 15 (which is shunted by a condenser 16) connects conductor 14 to ground. The negative side of a D.-C. source 17 is connected to the collector electrode 11 of transistor 7 by a conductor 18, the positive side of source 17 being grounded.

Fig. 2*a* is a curve of assumed amplitude variations with time of the auxiliary A.-C. signals $e_1$, in control circuit 3, the amplitude being zero for the time interval from zero to $t_1$, *a* for the time interval from $t_1$ to $t_2$, *b* for the time interval $t_2$ to $t_3$, *c* for the time interval $t_3$ to $t_5$, and zero for the time interval from $t_5$ to $t_7$. Fig. 2*b* shows the potential variations of the conductor 14 of Fig. 1 with respect to ground. When the signal $e_1$ in circuit 3 is zero for the time interval 0 to $t_1$, the collector current supplied by D.-C. source 17 through resistor 15 is at a very low value so that the voltage drop across resistor 15 is essentially zero and the potential of conductor 14 is, therefore, also zero. During the time interval $t_1$ to $t_2$, i. e. when the auxiliary signal has an amplitude $a$, the signal impressed upon the base electrode 8 causes an appreciable collector current (supplied by source 17) to flow through resistor 15. Accordingly, the potential of conductor 14 drops to a negative potential level $u$. As the amplitude of the auxiliary signal increases in successive steps from $a$ to $b$, $b$ to $c$ and $c$ to zero, the potential of conductor 14 decreases proportionally with respect to ground potential to levels $v$, $w$ and zero, respectively, as shown in Fig. 2$b$.

The primary-control circuit 1, as energized by an A.-C. source 20, is connected across the primary winding 21 of a coupling transformer 22. Transistor 23 having a base electrode 24, emitter electrode 25 and collector electrode 26 is connected in a grounded emitter arrangement for amplifying the primary A.-C. signals $e_2$ in circuit 1, so as to energize a load resistor 30 in the output circuit 2. A bias circuit 31 for the transistor 23 comprises a secondary winding 32 of coupling transformer 22 and a diode 33, these elements of the bias circuit 31 being connected between the base electrode 24 of transistor 23 and the conductor 14 associated with transistor 7. The diode 33 is oriented so that it is forward-biased by the negative potential variations of conductor 14. In order to complete the circuitry, emitter electrode 25 of transistor 23 is connected to ground through a resistor 34 shunted by a bypass condenser 35, and the load circuit 2 is connected between the collector electrode 26 and the negative side of D.-C. source 17. Additionally, a condenser 37 may be connected from the junction lead of winding 32 and diode 33 for effecting the control by D.-C. bias on transistor 23.

As shown in Fig. 2$c$, the primary-intelligence signals $e_2$ in control circuit 1 have an assumed amplitude $m$ and frequency $f_1$ for the time interval zero to $t_3$, an amplitude $m$ and a frequency $f_2$ for the time interval $t_3$ to $t_4$, an amplitude $n$ and a frequency $f_2$ for the time interval $t_4$ to $t_6$, and zero amplitude for the time interval $t_6$ to $t_7$.

With zero impressed auxiliary signal $e_1$ during the time interval zero to $t_1$, the potential of conductor 14 is substantially zero as explained above. However, with suitably selected values of resistor 15 and resistor 34, the diode 33 may be biased slightly in the reverse direction, giving an injection loss which effects a very high order of transmissional cut-off of any primary signals $e_2$ from the output circuit 2.

In connection with the circuitry disclosed in Fig. 1, Fig. 3 shows characteristic curves from which the voltage $e_3$ across the load resistor 30 in the load circuit 2 can be determined from known amplitude of primary-intelligence signals $e_2$ and auxiliary signals $e_1$. Thus, for a constant amplitude $m$ for the primary-intelligence signal $e_2$ for the time interval zero to $t_4$, the voltages $e_3$ across the load resistor 30, corresponding to auxiliary signals of amplitudes $a$, $b$ and $c$, are A, B and C, respectively, regardless of the frequency $f_1$ or $f_2$ of primary-intelligence signal $e_2$. For the time interval $t_4$ to $t_5$, when the amplitude of the primary signal $e_2$ is $n$, the output signal amplitude is D.

From the foregoing, it will be seen that the strength of the auxiliary signal impressed upon circuit 3 controls the bias of the amplifying transistor associated with circuit 2 in a manner to control the transmission of primary-intelligence signals through the gate circuitry.

Fig. 4 discloses application of the invention to a portable receiver which is employed in an auto-call system for paging a particular receiver among a plurality of receivers; the system employs two discrete modulated radio-frequency carriers F and F′ transmitted in separate channels by equipment not shown, carrier F being modulated by a continuous-wave audio frequency $f$, and carrier F′ being modulated by a continuous wave frequency $f'$. The receiver incorporates the gating and amplifying circuitry of Fig. 1 and in order to simplify the explanation of this embodiment of the invention, like reference numbers will be used to identify corresponding elements in both figures. The load resistor 30 in Fig. 1 is represented as a permanent-magnet speaker 30 in Fig. 4, this speaker having a resonant response to audio frequency $f$ but not to frequency $f'$.

In one receiving channel, a radio-frequency tuner 40 and associated loop antenna 41 drive a transistor 42, connected as a detector. The demodulated output of detector 42 is amplified by transistor 43 for driving the primary-control circuit 1 of the previously disclosed gating and amplifying circuitry, having speaker 30 in its output circuit 2. Similarly, in another receiving channel a radio-frequency tuner 40′ and associated loop antenna 41′ drive a transistor 42′, connected as a detector. The demodulated output of detector 42′ is amplified by transistor 43′ for driving the auxiliary control circuit 3 of the previously disclosed gating and amplifying circuitry.

Thus, if radio-frequency tuner 40′ is tuned to the modulated carrier frequency F′, its demodulated signal $f'$ will forward-bias the diode 33 to unblock and control the gain of transistor 23. If at the same time, radio-frequency tuner 40 is tuned to the modulated carrier frequency F, its demodulated signal $f$ will be amplified by the unblocked transistor 23 to audibly drive speaker 30 for paging the person carrying this particular receiver. A permutation investigation reveals that with $n$ available radio-frequency channels, the disclosed auto-call system can be multiplexed to provide $n(n-1)$ discrete paging channels, i. e. different and uniquely identifiable paging stations according to Fig. 4.

In one receiving channel (primary intelligence) of Fig. 4, radio-frequency tuner 40 comprises an R.-F. transformer 50 having its primary winding 51 shunted by tuning condenser 52, one end of its secondary winding 53 being connected to the base electrode 54 of detector-transistor 42, and its other end being connected through a tuning condenser 55 to the grounded emitter electrode 56 of detector-transistor 42. The collector electrode 57 of detector-transistor 42 is connected to the negative terminal of D.-C. source 17 through a resistor 58, the resistor being shunted by a condenser 59. The demodulated signal of the carrier tuned by radio frequency tuner 40 appears across the resistor 58, and is impressed across the base electrode 60 and emitter electrode 61 of amplifier-transistor 43, this connection being made through a coupling condenser 62 in the base circuit; a resistor 63, shunted by a condenser 64, connects the emitter circuit to ground. The primary-intelligence control circuit 1 is connected between the collector electrode 65 of amplifier transistor 43 and the negative terminal of D.-C. source 17.

In the other receiving channel (auxiliary signals) of Fig. 4, the components associated with tuner 40′, detector-transistor 42′ and amplifier-transistor 43′ correspond to those associated with tuner 40, detector transistor 42 and amplifier transistor 43, and the corresponding parts of the former group have therefore been given the same reference numbers, with primed notation. The auxiliary circuit 3 is connected between the collector electrode 65′ of amplifier transistor 43′ and the negative terminal of the D.-C. source 17.

With the described circuit, it will be seen that a continuous note of frequency $f$ will be reproduced by speaker 30 for paging purposes whenever the radio-frequency components driving the primary-intelligence control circuit 2 (associated with transistor 23) are tuned to an existing carrier F modulated by frequency $f$, provided that the radio-frequency components driving the auxiliary-control circuit 3 are tuned to a simultaneously existing modulated carrier F′, and the amplitude with which the frequency $f$ appears at the speaker 30 will depend upon the instantaneous detected envelope of the carrier F′.

While it will be understood that the circuit specifications may vary according to the design for any particular application, the following circuit specifications are included by way of example only:

| | |
|---|---|
| Transistors **7, 23, 42, 43, 42'** and **43'** | Type CK721. |
| Diode **33** | Type IN63. |
| Resistor **15** | 10,000 ohms |
| Resistor **34** | 1,000 ohms. |
| Condensers **16** and **35** | 20 μf. |
| Battery **17** | 4.5 volts. |
| Carrier frequencies F and F' | Between 200 and 582 kc./s. |
| Modulation frequency *f* | 200 C. P. S. |
| Antennas **41** and **41'** | 11 turns, 1" by 2". |
| Tuning condensers **52** and **52'** | 500 μμf. |
| Tuning condensers **55** and **55'** | 0.1 μf. |
| Resistors **58** and **58'** | 10,000 ohms. |
| Condensers **59** and **59'** | 100 μμf. |
| Condensers **62** and **62'** | 0.1 μf. |
| Resistors **63** and **63'** | 10,000 ohms. |
| Condensers **64** and **64'** | 15 μf. |

It is to be understood that various modifications of the invention other than those above described may be effected by persons skilled in the art without departing from the principle and scope of the invention as defined in the appended claims.

What is claimed is:

1. In a system for controlling the gating and amplifying of a primary signal by an auxiliary signal, circuit means comprising an auxiliary control circuit adapted to have auxiliary signals impressed thereon, rectifying means connected to said auxiliary control circuit for deriving direct current potentials corresponding to the auxiliary signals, a transistor having base, emitter and collector electrodes, means applying a direct current potential across said emitter and collector electrodes, an output circuit coupled across said emitter and collector electrodes, a bias circuit comprising in series connection the said emitter and base electrodes, said rectifying means, and a diode; said diode being connected to be forward-biased by said rectifying means; a primary control circuit adapted to have primary-intelligence alternating current signals impressed thereon; and means coupling said primary control circuit to said bias circuit.

2. Circuit means as claimed in claim 1, including means in said bias circuit operative to slightly reverse bias said diode when no signal is present in said auxiliary circuit.

3. Circuit means as claimed in claim 1, wherein a condenser is connected in shunting relation with said rectifying means.

4. In a system for controlling the gating and amplifying of a primary signal by an auxiliary signal, circuit means comprising a first transistor having base, emitter and collector electrodes, an auxiliary control circuit adapted to have alternating current signals impressed thereon, said auxiliary circuit being coupled across the base and emitter electrodes of said first transistor, a direct current source, a collector circuit connected across said direct current source and including in series connection the emitter and collector electrodes of said first transistor, a resistor, a condenser shunted across said resistor, said circuit means also comprising a second transistor having base, emitter and collector electrodes, means connecting said direct current source across the emitter and collector electrodes of said second transistor, an output circuit coupled across the emitter and collector electrodes of said second transister; a bias circuit including in series connection the emitter and base electrodes of said second transistor, said resistor, and a diode; a primary-signal control circuit adapted to have alternating current signals impressed thereon, and means coupling said primary control circuit to said bias circuit, said diode being oriented in said bias circuit to be forward-biased by the rectified voltage across said resistor.

5. Circuit means as claimed in claim 1, including means in said bias circuit operative to slightly reverse bias said diode when no signal is present in said auxiliary circuit.

6. Circuit means as claimed in claim 5, wherein said reverse-biasing means includes a second resistor connected to the emitter of said second transistor as a common element in said output circuit and said bias circuit.

7. A receiver in an auto-call system having two modulated radio-frequency channels, said receiver comprising two antennas, first and second radio-frequency tuners connected respectively to said antennas, each tuner being tuned to a different one of the two radio-frequency channels, a detector connected to each radio-frequency tuner, a first transistor having base, emitter and collector electrodes, means coupling the output of one of the said detectors across the base and emitter electrodes of said first transistor, a direct current source; a collector circuit connected across said direct current source and including the emitter and collector electrodes of said first transistor, a resistor, and a condenser shunted across said resistor; said receiver also comprising a second transistor having base, emitter and collector electrodes; means connecting said direct current source across the emitter and collector electrodes of said second transistor; an output circuit including a speaker coupled to the emitter and collector of said second transistor; a bias circuit including in series connection the emitter and base electrodes of said second transistor, said resistor and a diode; and means coupling the output of the other of said detectors only when said one detector yields an output.

8. Circuit means as claimed in claim 7, including means in said bias circuit operative to slightly reverse-bias said diode when the output from said one detector is zero.

9. Circuit means as claimed in claim 8, wherein said reverse-biasing means includes a second resistor connected to the emitter of said second transistor as a common element in said output circuit and said bias circuit.

References Cited in the file of this patent

UNITED STATES PATENTS

| | | |
|---|---|---|
| 2,129,740 | Lewis | Sept. 13, 1938 |
| 2,330,241 | Roberts | Sept. 28, 1943 |
| 2,392,672 | Koch | Jan. 8, 1946 |
| 2,676,271 | Baldwin | Apr. 20, 1954 |
| 2,777,057 | Pankove | Jan. 8, 1957 |
| 2,802,938 | Herzog | Aug. 13, 1957 |

OTHER REFERENCES

Pub. I. Tele-Tech and Electronic Industries, August 1956, pp. 66–67, 150–154.